(12) United States Patent
Guenther et al.

(10) Patent No.: US 7,945,427 B2
(45) Date of Patent: May 17, 2011

(54) METHODS AND SYSTEMS FOR PROVIDING UNANTICIPATED DEMAND PREDICTIONS FOR MAINTENANCE

(75) Inventors: Nicholas A. Guenther, Imperial, MO (US); April Y. Nash, St. Louis, MO (US); Stan A. Kolasa, Edwardsville, IL (US)

(73) Assignee: The Boeing Company, Chicago, IL (US)

( * ) Notice: Subject to any disclaimer, the term of this patent is extended or adjusted under 35 U.S.C. 154(b) by 491 days.

(21) Appl. No.: 12/105,945

(22) Filed: Apr. 18, 2008

(65) Prior Publication Data

US 2009/0265118 A1  Oct. 22, 2009

(51) Int. Cl.
*G21C 17/00* (2006.01)
*G01B 3/44* (2006.01)

(52) U.S. Cl. .............. 702/184; 702/34; 702/181; 705/9; 716/4

(58) Field of Classification Search .............. 702/34, 702/35, 81, 82, 83, 181, 184, 185; 701/3, 701/29; 340/506; 705/9; 714/37, 47; 716/4
See application file for complete search history.

(56) References Cited

U.S. PATENT DOCUMENTS

| | | | |
|---|---|---|---|
| 3,979,579 A | 9/1976 | Kleinpeter | |
| 4,943,919 A | 7/1990 | Aslin | |
| 5,822,218 A * | 10/1998 | Moosa et al. | 716/4 |
| 6,289,289 B1 | 9/2001 | Zweifel | |
| 6,574,537 B2 | 6/2003 | Kipersztok et al. | |
| 6,684,349 B2 | 1/2004 | Gullo et al. | |
| 6,834,256 B2 | 12/2004 | House et al. | |
| 6,868,325 B2 | 3/2005 | Menon et al. | |
| 7,107,491 B2 | 9/2006 | Graichen et al. | |
| 7,149,659 B1 | 12/2006 | Lesmerises | |
| 7,230,527 B2 | 6/2007 | Basu et al. | |
| 2008/0177613 A1 * | 7/2008 | Chan et al. | 705/9 |

* cited by examiner

*Primary Examiner* — John H Le
(74) *Attorney, Agent, or Firm* — Armstrong Teasdale LLP

(57) ABSTRACT

A method for predicting a probability of failure for a component of a platform at a specified time is described. The method includes collecting historical maintenance data relating to the component, selecting, utilizing the collected historical maintenance data, a lifetime distribution model that best fits the historical maintenance data, estimating upcoming component failures using the selected lifetime distribution model, and applying maintenance schedule dates for the platform to the upcoming component failures to determine a likelihood of failure of the component on one of the scheduled maintenance dates.

15 Claims, 9 Drawing Sheets

METHODS AND SYSTEMS FOR PROVIDING UNANTICIPATED DEMAND PREDICTIONS FOR MAINTENANCE

BACKGROUND OF THE INVENTION

The field of the invention relates generally to maintenance operations, and more specifically, to methods and systems for providing unanticipated demand predictions relating to the maintenance of platforms, such as a flight platform.

A substantial number of airframes built over the past five decades are still in service. Many of these airframes have exceeded their original designed life and have caused an unanticipated demand for replacement and spare parts. Many of these replacement and spare parts demands have been caused by the lengthening of the service life of the aircraft and are for parts that were not originally contemplated as being replaceable. Such parts are referred to herein as low mortality, long lead-time, replacement parts.

Occasionally, replacement parts come from existing platforms that are no longer in service. This process is not typically documented and the scarcity of the available platforms and parts to be cannibalized is necessitating procurement alternatives through traditional sourcing.

The traditional sourcing of low mortality, long lead-time, replacement parts for a platform, such as a flight platform, is difficult and time consuming. Predicting the failure of such parts is difficult, in one aspect, because their host platforms are outlasting their anticipated lifetimes. Therefore, when a part for a platform does fail, or it is determined to replace such a part, it can often take months to procure and then replace the part. During this replacement part lead time, the platform is out of service because a demand for such a part was unanticipated.

It is believed that there are no current solutions that adequately address the need for better prediction of long lead time part failure. Specifically, the majority of the forecasting software that is available does not automatically provide and apply a suggested lifetime model. This forecasting software also does not automatically run goodness of fit and lack of fit tests and make the entire process fluid to a user.

Data collection and mining for field and depot maintenance is time consuming and inconsistent from platform to platform. Other disadvantages are that it takes a well-trained statistician to understand and use the modeling techniques. Currently utilized data collection and mining applications also require that tests for each lifetime model are manually run. Additionally, such applications also dictate that goodness of fit tests and lack of fit tests be run manually.

In order to avoid these long lead times, better failure predictive methods need to be formulated from the known and simulated maintenance data for these types of parts. Field and depot maintenance replacement data is one source of data for such predictive methods.

BRIEF DESCRIPTION OF THE INVENTION

In one aspect, a method for predicting a probability of failure for a component of a platform at a specified time is provided. The method includes collecting historical maintenance data relating to the component, selecting, utilizing the collected historical maintenance data, a lifetime distribution model that best fits the historical maintenance data, estimating upcoming component failures using the selected lifetime distribution model, and applying maintenance schedule dates for the platform to the upcoming component failures to determine a likelihood of failure of the component on one of the scheduled maintenance dates.

In another aspect, a system for predicting a probability of failure for a component of a platform at a specified time is provided. The system includes at least one computer programmed to receive and store historical maintenance data relating to the component, select a lifetime distribution model that best fits the stored historical maintenance data, estimate an upcoming component failure using the selected lifetime distribution model, and apply a maintenance schedule dates for the platform to the upcoming component failure estimate to determine a likelihood of failure of the component on one of the scheduled maintenance dates.

In still another aspect, a maintenance and repair method associated with low volume and long lead time parts for a platform is provided. The method includes utilizing a depot maintenance schedule to identify scheduled visits of a platform to a depot level maintenance area, retrieving maintenance data relating to low volume and long lead time parts associated with the platform, mining the retrieved maintenance data to determine a lifetime distribution model that best fits historical part failures, applying a dynamic model to each part lifetime to produce a failure propensity coefficient for each part with respect to each scheduled depot level maintenance area visit, and building an estimated demand plan for upcoming part failures, based on the failure propensity coefficients and the scheduled depot level maintenance area visits.

DETAILED DESCRIPTION OF THE INVENTION

Figure 1:
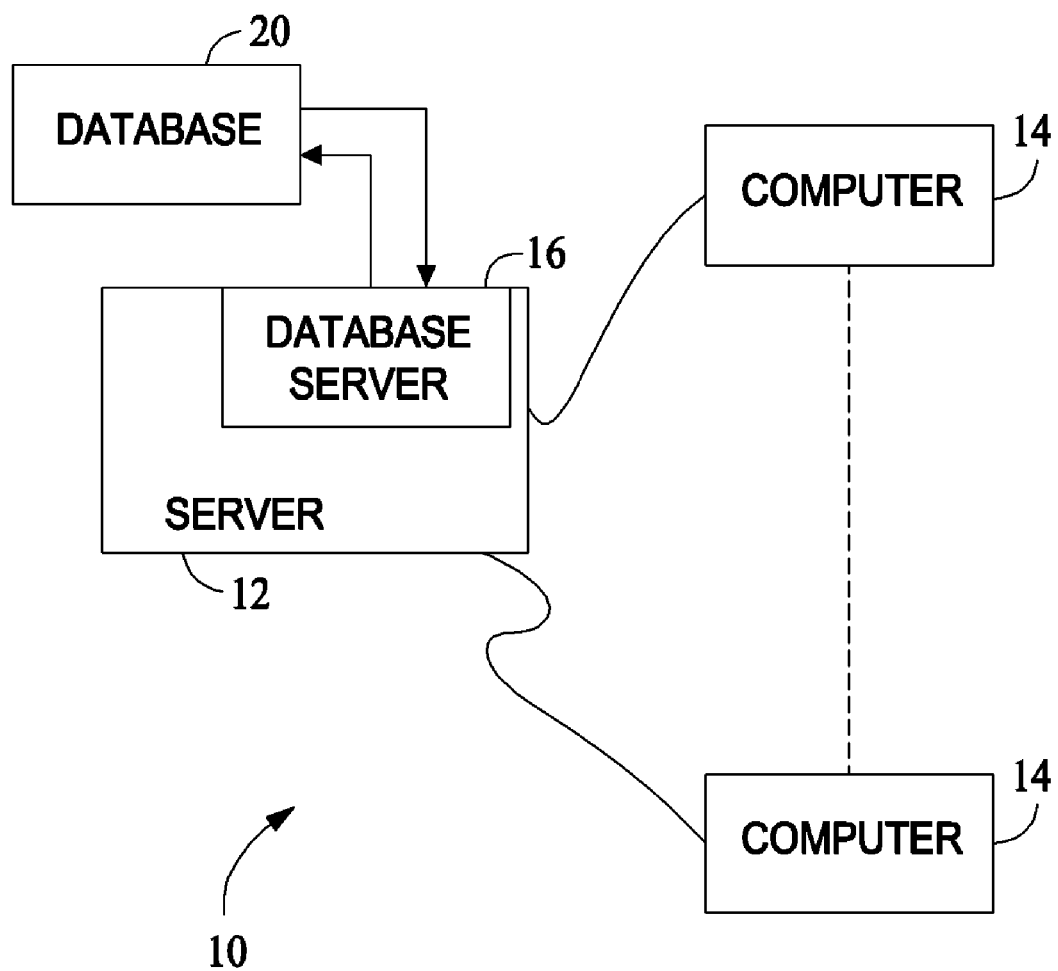
FIG. 1 is a simplified block diagram of an exemplary embodiment of a server architecture of a system.

The embodiments described herein detail the creation of a process to automatically collect historical component maintenance data for low mortality parts. The process also includes determining a best lifetime distribution model using a predetermined goodness of fit factor (and subsequent lack of fit tests) to predict future part demand at a specified point in time.

The process includes collection of data using intelligent agents and subsequently selecting the best lifetime distribution model as a basis to predict the probability of failure of a part at a specified time. In a specific embodiment, the selected time will be concurrent with a future depot level maintenance visit. Therefore, depot level maintenance labor can be scheduled and part procurement can begin prior to discovery of a failure.

More specifically, a method is described for predicting the probability of failure of a part at the specified time of an upcoming depot visit so maintenance labor can be scheduled and part procurement can begin prior to discovery of a failure. The method includes collecting historical component maintenance data for low mortality parts using intelligent agents, and cleaning and mining the collected data such that it can be presented in a standard format. The best lifetime distribution model is then selected, upcoming depot visit schedules are integrated to determine the forecasting point for each part lifetime, and the probability of failure and subsequent demand in a chosen time period are predicted.

To select the best lifetime distribution model, incomplete data is censored and additional lifetime simulations are added where necessary. In addition, the goodness of fit is run for each lifetime distribution model and model selection is validated by checking for lack of fit. To predict a failure within a chosen time period, a confidence and probability of failure at upcoming depot visit are evaluated, a likelihood of part failure in the time following the depot visit is evaluated, and a lead time for part procurement if replacement probability is high is evaluated.

Existing solutions require many manual choices for users that typically are not seamlessly integrated with existing software and operating systems. For example, maintenance data collection efforts are inconsistent and are based on manual intervention from different functional groups. Once the data collection is complete much effort is required to manually interpret the information. The above described process, and systems utilizing the above described process, produce the best model selection and validate the selection, not just once with a goodness of fit test, but twice by also checking for even error residual distribution across each quartile. In addition, the processes described herein provide an additional opportunity to isolate non-conforming data, to achieve a higher level of forecasting integrity and more appropriate model selection.

The embodiments described herein enable system users to utilize a modeling system to determine a need for checking and potentially replacing failed or defective parts. Initially the system would be utilized at a designated time before a platform, such as an airframe, was scheduled for depot maintenance. A technical effect of such embodiments is an ability to recognize a standard lead time for each part procurement as the primary driver to determine the optimal lead time. Initially, the maintenance scheduler retrieves the field and depot maintenance data at the part serial number level. A further technical effect is the extraction of field maintenance data from applicable databases. All in-service maintenance performed is extracted and loaded into a common format that is interpreted by the described modeling engine. The maintenance data retrieved includes all pertinent records for all like platforms and associated parts. In certain embodiments, records are collected at the serial number tracking level which allows data cleansing so that duplicate parts on the same platform will not cause data corruption during the lifetime modeling.

FIG. 1 is a simplified block diagram of an exemplary system 10 in accordance with one embodiment of the present invention. In one embodiment, system 10 is a computer system that includes a processing device used for determining predicting a probability of part failures and selecting lifetime distribution models as further described herein. As further described computer system 10 incorporates a user interface through which an ability is provided to collect historical component maintenance data for low mortality parts using intelligent agents. Through the user interface, a user is able to clean and mine the collected data such that it can be presented in a standard format. In another embodiment, system 10 is programmed with a user interface through which a user can run a goodness of fit program for each model while model selection is validated by checking for lack of fit.

More specifically, in the example embodiment, system 100 includes a server system 12, and a plurality of client subsystems, also referred to as client systems 14, connected to server system 12. In one embodiment, client systems 14 are computers including a web browser, such that server system 12 is accessible to client systems 14 using the Internet. Client systems 14 are interconnected to the Internet through many interfaces including a network, such as a local area network (LAN) or a wide area network (WAN), dial-in-connections, cable modems and special high-speed ISDN lines. Client systems 14 could be any device capable of interconnecting to the Internet including a web-based phone, personal digital assistant (PDA), or other web-based connectable equipment. A database server 16 is connected to a database 20 containing information on a variety of matters, as described below in greater detail. In one embodiment, centralized database 20 is stored on server system 12 and can be accessed by potential users at one of client systems 14 by logging onto server system 12 through one of client systems 14. In an alternative embodiment, database 20 is stored remotely from server system 12 and may be non-centralized.

Figure 2:
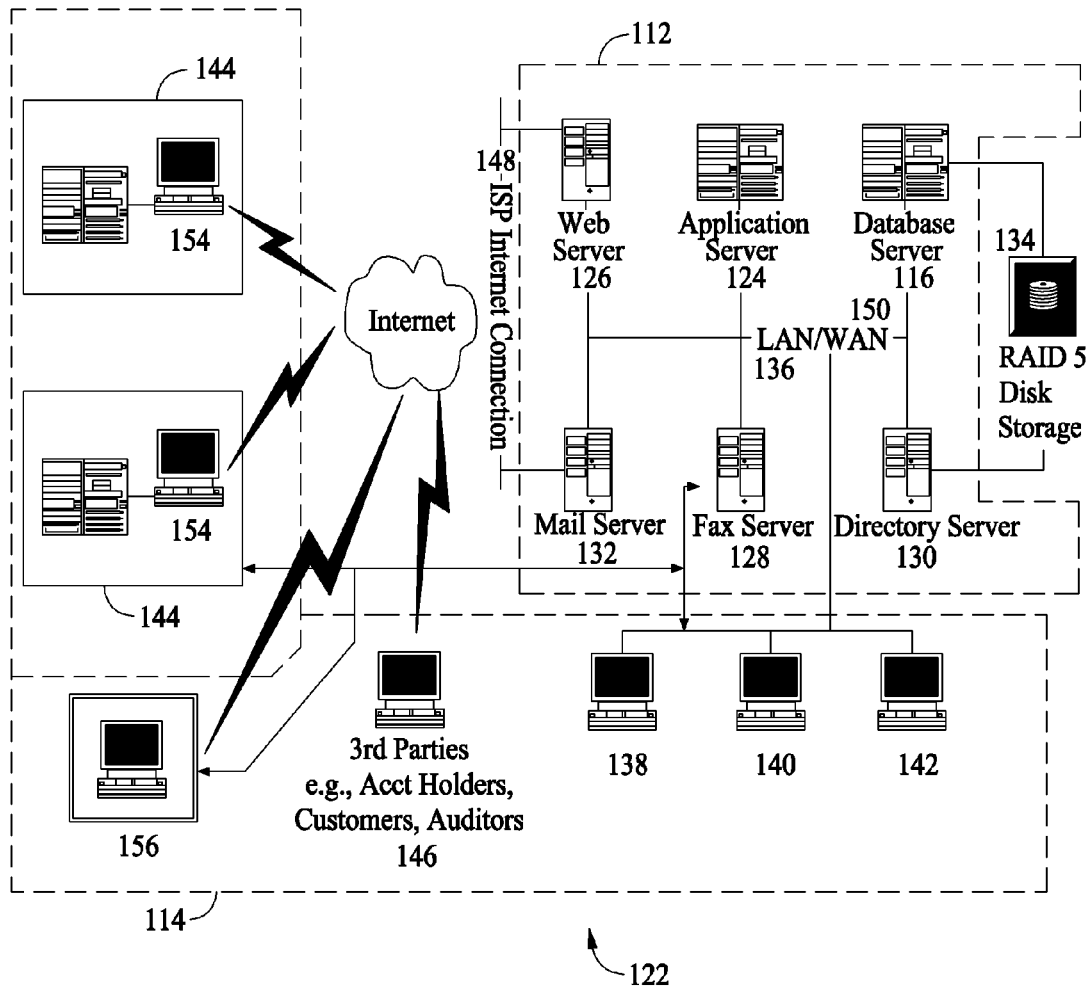
FIG. 2 is an expanded block diagram of an exemplary embodiment of a server architecture of a system.

FIG. 2 is an expanded block diagram of an exemplary embodiment of a server architecture of a system 122 in accordance with one embodiment of the present invention. Certain components in system 122 may be identical to components of system 10 (shown in FIG. 1), though they are identified in FIG. 2 using different reference numerals. System 122 includes server system 112 and client systems 114. Server system 112 further includes database server 116, an application server 124, a web server 126, a fax server 128, a directory server 130, and a mail server 132. A disk storage unit 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, etc., 146 using an ISP Internet connection 148. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

Figure 3:
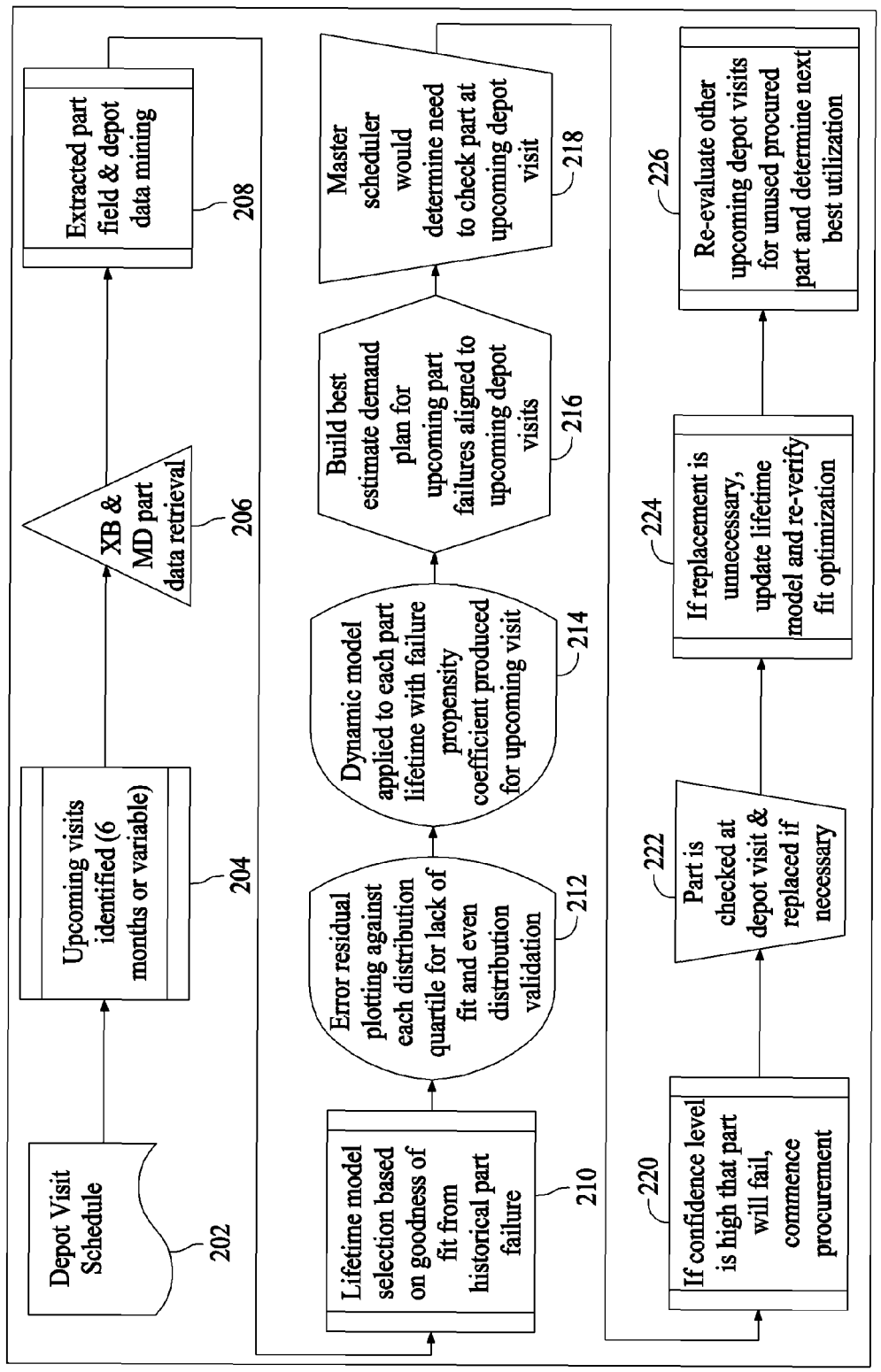
FIG. 3 is a flow chart illustrating a process workflow related to the collection of data using intelligent agents, and selection of a lifetime distribution model as a basis to predict the probability of failure of a part at a specified time.

FIG. 3 is a flowchart 200 illustrating a process workflow related to the collection of data using intelligent agents, and selection of a lifetime distribution model as a basis to predict the probability of failure of a part at a specified time. The process workflow may be implemented on the systems described with respect to FIGS. 1 and 2. More specifically, a depot maintenance schedule 202 is utilized to identify 204 visits of a platform to a depot level maintenance area. Data relating to low volume (XB) and long lead time (MD) parts is retrieved 206. The extracted part field and any depot maintenance data is then data mined 208 and a lifetime model is selected 210 based on a goodness of fit from historical part failures.

Error residuals are plotted 212 against each distribution quartile for lack of fit and even distribution validation. A dynamic model is then applied 214 to each part lifetime to produce a failure propensity coefficient for an upcoming depot maintenance level visit. A best estimate demand plan is built 216 for upcoming part failures and aligned to upcoming depot maintenance level visits. A master scheduler determines 218 a need to check specific parts at an depot maintenance level visit.

If a confidence level that a part will fail at the depot maintenance level visit is above a threshold, procurement of the replacement part is commenced 220. Finally the part in question is checked 222 during a depot maintenance level visit for the platform on which the part is deployed. If it turns out that the part has not failed, and does not need to be replaced, the lifetime model for the part is updated 224, and fit optimization is re-verified. Other upcoming depot maintenance level visits are re-evaluated 226 to determine the next best utilization for the unused, but now procured replacement part.

Figure 4:
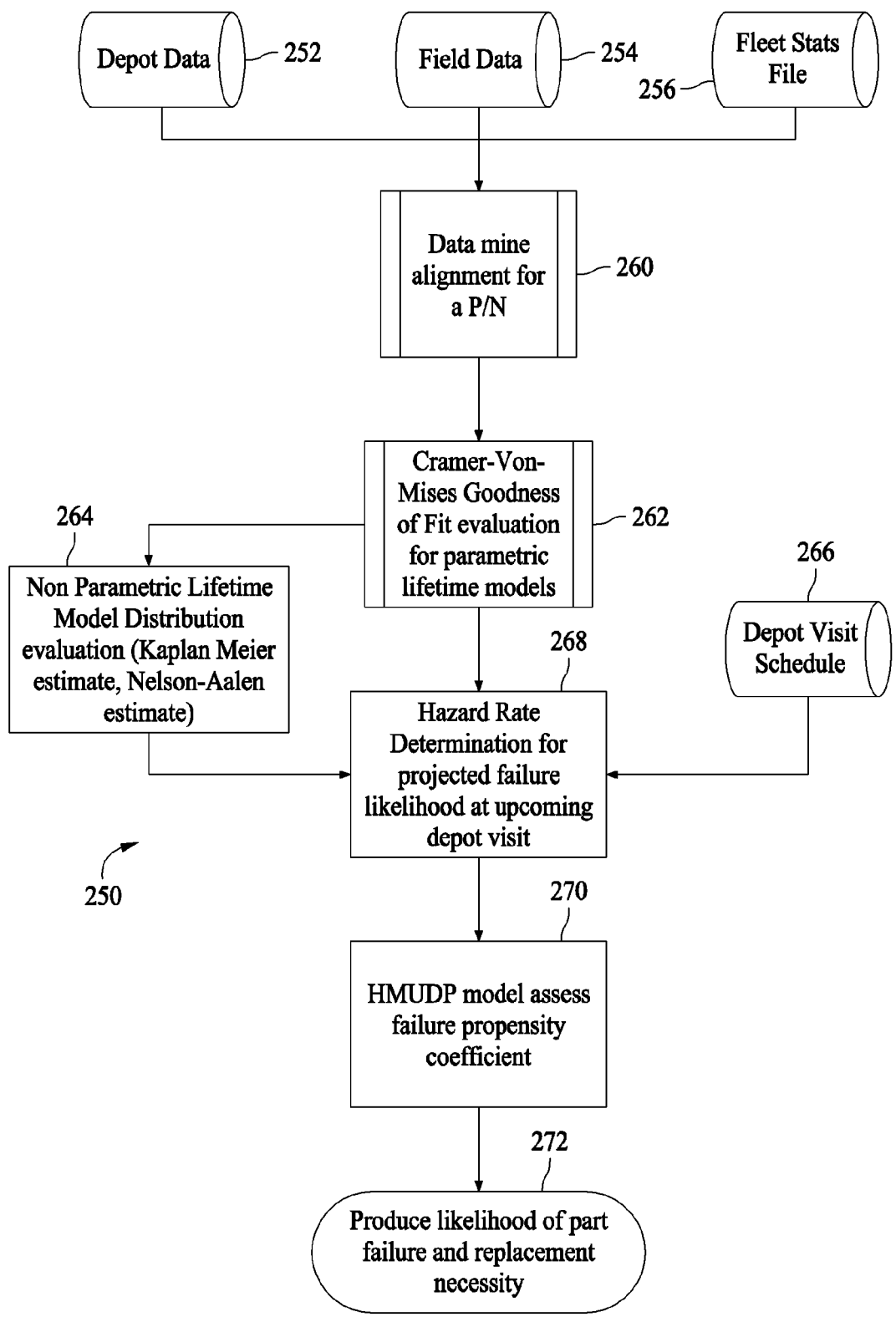
FIG. 4 is a flowchart illustrating a data mining process related to the collection of field and depot maintenance data to generate fleet statistical data, along with a goodness of fit evaluation and a failure propensity determination.

FIG. 4 is a flowchart 250 further illustrating the herein described data mining and modeling process related to the collection of field and depot maintenance data to generate fleet statistical data, along with a goodness of fit evaluation and a failure propensity determination. Referring to flowchart 250, depot data 252, field data 254, and a statistical file 256 are collected and data mined 260 for alignment with a specific part number. In the illustrated embodiment, a distribution and a Cramer-Von-Mises goodness of fit evaluation is performed 262 for parametric lifetime models. Additionally, a non-parametric lifetime model distribution evaluation may be conducted 264 as described herein.

A depot maintenance schedule 266 is combined with the parametric and any non-parametric distribution data to determine 268 a hazard rate for a projected part failure likelihood at an upcoming depot maintenance visit. Utilizing the determined 268 hazard rate a demand prediction model assesses 270 a part failure propensity coefficient and produces 272, as further described herein, a likelihood of a part failure and a replacement necessity.

The maintenance data retrieved includes all pertinent records for all like platforms and associated parts. In one embodiment, records are collected at the serial number tracking level which allows data cleansing so that duplicate parts on the same platform do not cause data corruption during the lifetime modeling. The value of the depot maintenance data is significant in the modeling process because of the high integrity of the data. Depot data is stored much more efficiently. Scheduled depot data is available on individual part numbers at the position number level. The superior data structure ensures that each maintenance entry corresponds directly to a unique part lifespan which is utilized in the lifetime model selection process.

In addition to the data from the field and depot records, it is necessary to extract data from a part master list. The individual airframe and part history (including delivery dates, maintenance records, and codes) are also collected for each of the records in the platform parts master list. Depending on the requisitioning service and platform, the data needs to be collected from the applicable database determine which XB and MD parts will be run through the forecasting model.

Figure 5:
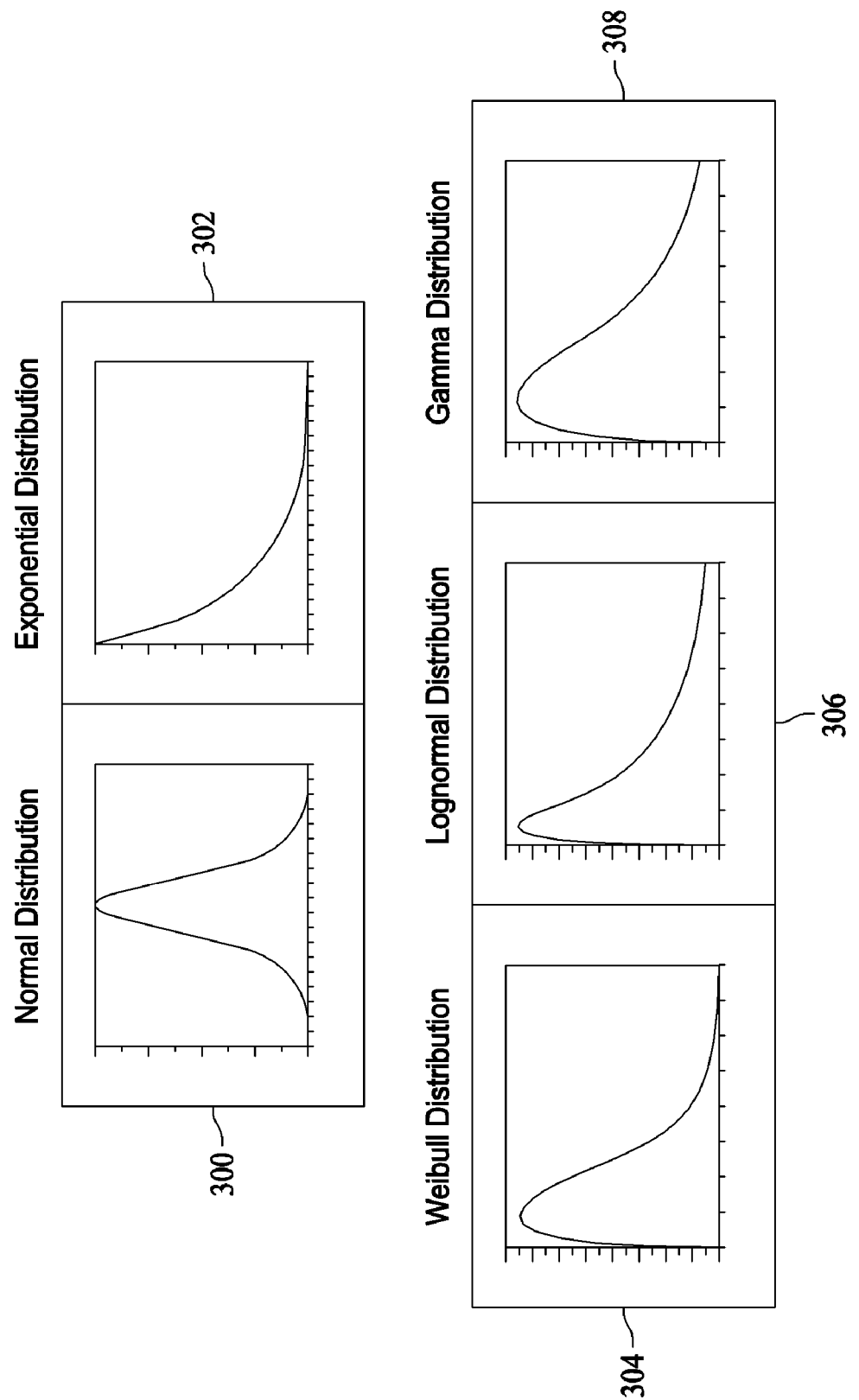
FIG. 5 is an illustration of five distribution models.

At completion of the data extraction, all updates to field and depot part maintenance history and fleet statistics part data are applied into a comparative engine that finds the best fit by contrasting the actual failure and lifetime data to several lifetime models. In one embodiment, the fit is evaluated using the Cramer-Von-Mises test statistic to find the most appropriate model. Cramer-Von-Mises testing produces a quantity called 'P' value between 0 and 1 that describes how closely the resulting data emulates the distribution for each model. The value closest to 1 is the lifetime part model with the best fit according to the model analysis. The lifetime model producing the highest 'P' value (which describes accuracy of fit for actual data to model) is selected as the lifetime model to predict future part failures. In one embodiment, analysis of the extracted data is conducted utilizing the five most prevalent lifetime distribution models to interpret the results. As illustrated in FIG. 5, the five distribution models include a normal distribution model 300, an exponential distribution model 302, a Weibull distribution model 304, a lognormal distribution model 306, and a gamma distribution model 308. The embodiments are not limited to these five distribution models and other distribution models can be added to these five or be substituted for one or more of the five distribution models that are illustrated in FIG. 5.

Figure 6:
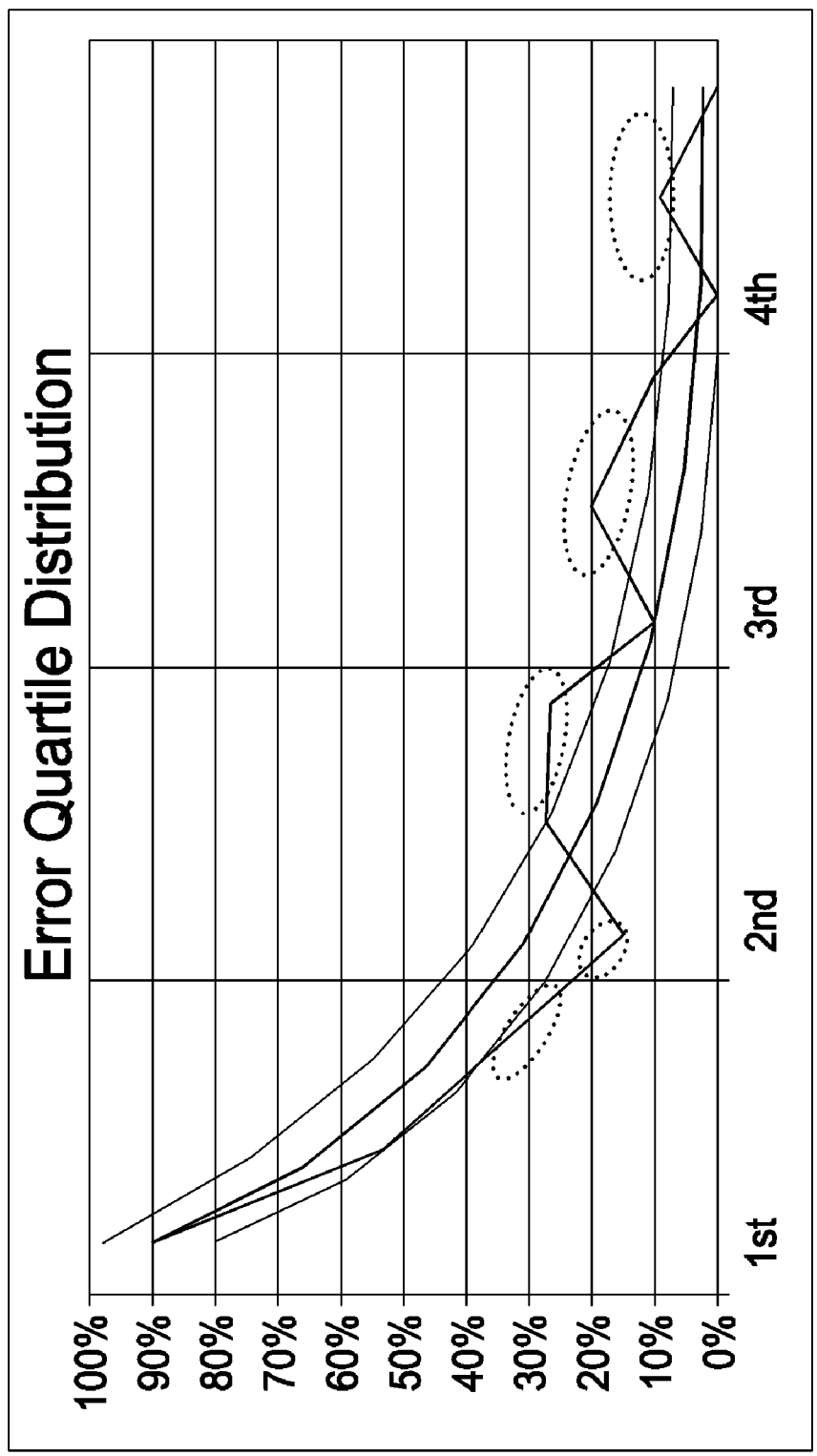
FIG. 6 is an example of a quartile plot for an exponential distribution.

It is possible to add an additional element of validation to this process. Often during the validation process, the distribution of residuals (part lifetimes that do not fit exactly onto the part lifetime model) is compared with that of the errors in the lifetime model using a quartile plot. An example of such a quartile plot 320 for an exponential distribution is shown in FIG. 6. If the fitted model is correct, the distribution of residuals should fluctuate around the error distribution derived from the lifetime model. However, abnormal deviation from the error distribution can be and are interpreted as potential deficiencies in the particular lifetime model selection.

To validate the suitability and superiority of the chosen model, use of a lack-of-fit test determines if the errors associated with the lifetime model show statistically significant inadequacies in the model selection. Residual modeling and interpretation of the variance and randomness of the data points indicates the goodness of fit or interpretation of the lack of fit. By checking for distribution of error residuals in a quartile probability plot, it is possible to evaluate the deviation from the lifetime model and ensure that it is consistently distributed across each quartile of the distribution. Benefits are realized by the incorporation of a standard histogram showing the residuals by its distribution. Through proper analysis of the pertinent error values that do not conform to the predictive model, it is possible to further validate the most appropriate model selection. The residuals should be distributed according to the assumed lifetime model and, if they are not, it is indicative that an alternative lifetime model might be more appropriate.

A cumulative distribution function (CDF) for the selected lifetime model is created for each part to establish the compounding aggregation of failure throughout its lifetime. In regard to the herein described embodiments, the CDF is the substance of the logic for determining a probability of when each part lifetime will lapse. A rate at which parts fail is represented by a hazard rate and is generated for the selected model. The hazard rate is a quantitative formula used to calculate the current failure rate given a specific point in time.

Figure 7:
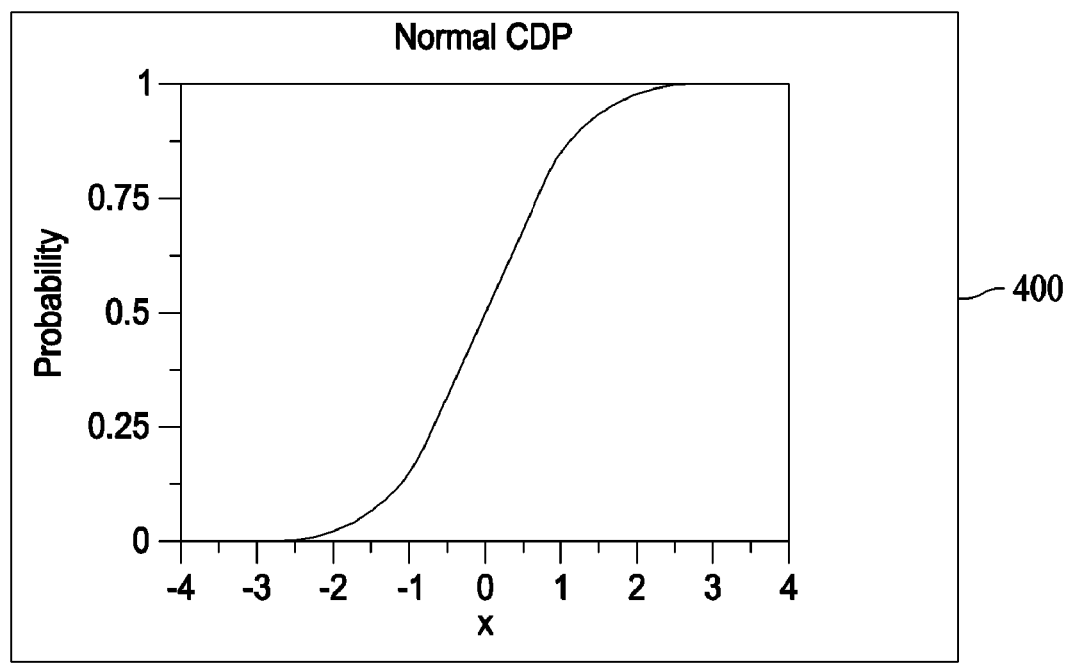
FIG. 7 includes a cumulative distribution function that illustrates an aggregation of failures over time and a hazard rate that illustrates a more constant failure probability.
Figure 7:
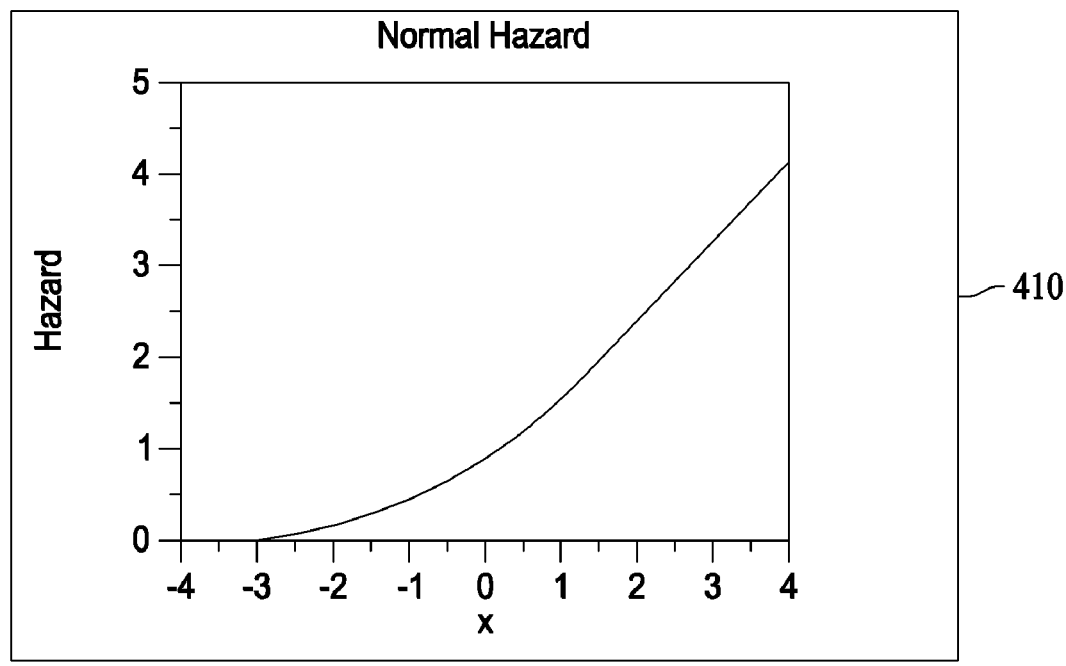

In FIG. 7, the CDF 400 illustrates an aggregation of failures over X (time), while the hazard rate 410 illustrates a more constant failure probability over X. The illustration of FIG. 7 is particularly relevant because while the CDF shows an escalation of failures over time, it is the hazard rate that shows the rate of failure for any given time, demonstrating consistency and predictability of part failure.

By extracting and utilizing the CDF and hazard rate, the scheduled maintenance date is applied to the model to evaluate the likelihood of part failure on the actual scheduled maintenance date. The likelihood of this failure is represented as the failure propensity coefficient and is presented to the maintenance scheduler. The maintenance schedules can utilize this information to decide if a part should be on the upcoming maintenance inspection schedule. Depending on the level of confidence and likelihood of part failure, there are also opportunities to commence part procurement for the anticipated replacement prior to the scheduled maintenance activity.

In one application of part failure forecasting, lifetime maintenance and fleet statistic datasets were compared with the five different lifetime distribution models. Results over 0.05 when evaluating the P-value from each model were to be considered to be appropriate candidates. In this particular application, each model was manually tested and upon comparing the resulting P-values of the dataset for each of the five models, the exponential model resulted in the best fit with a P-value of 0.190. The results eliminated the normal (P<0.005), lognormal (P=0.005), and gamma (P<0.001) distributions candidates while the Weibull (P=0.083) and exponential (P=0.190) distributions were identified as potential candidates.

Part failure forecasting is enabled when there is a correlation between both the part maintenance history and the time since delivery. In the event that there is no relationship (as indicated by a P-value of less than 0.05), modeling needs to be further refined so that non-parametric lifetime distributions such as Kaplan-Meier or Nelson-Aalen estimation can be used.

In the one application of part failure forecasting detailed herein, and the establishment of the capability for the exponential model to accurately represent the lifetime data, data analysis was run for the exponential lifetime distribution model to generate the density, CDF, and hazard rate for estimation of upcoming part failures.

Figure 8:
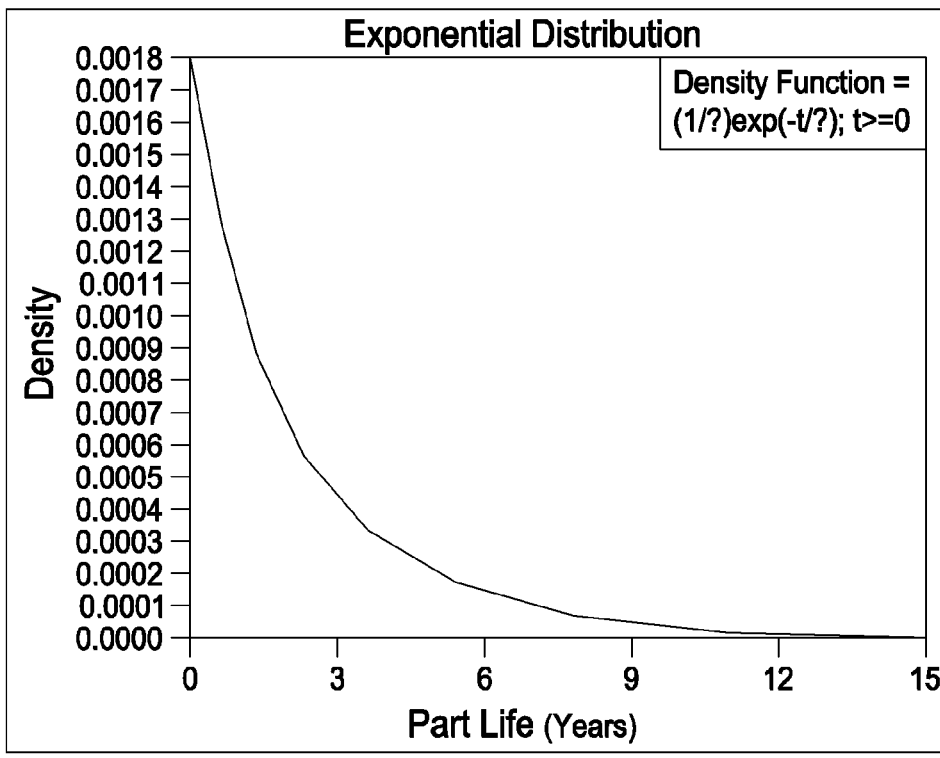
FIG. 8 illustrates a distribution of part lifetime data through a density exponential distribution.

Referring now to FIG. 8, a density exponential distribution 420 illustrates an actual distribution of part lifetime data. The simulated lifetime age for the part as it pertains to how much time passed before each part failed is represented. The exponential distribution model is represented by a density function 420 as illustrated in FIG. 8. Through the density function 420, the cumulative distribution function (CDF) is calculated to illustrate an aggregation of compounding failure likelihood with the passing of time.

Figure 9:
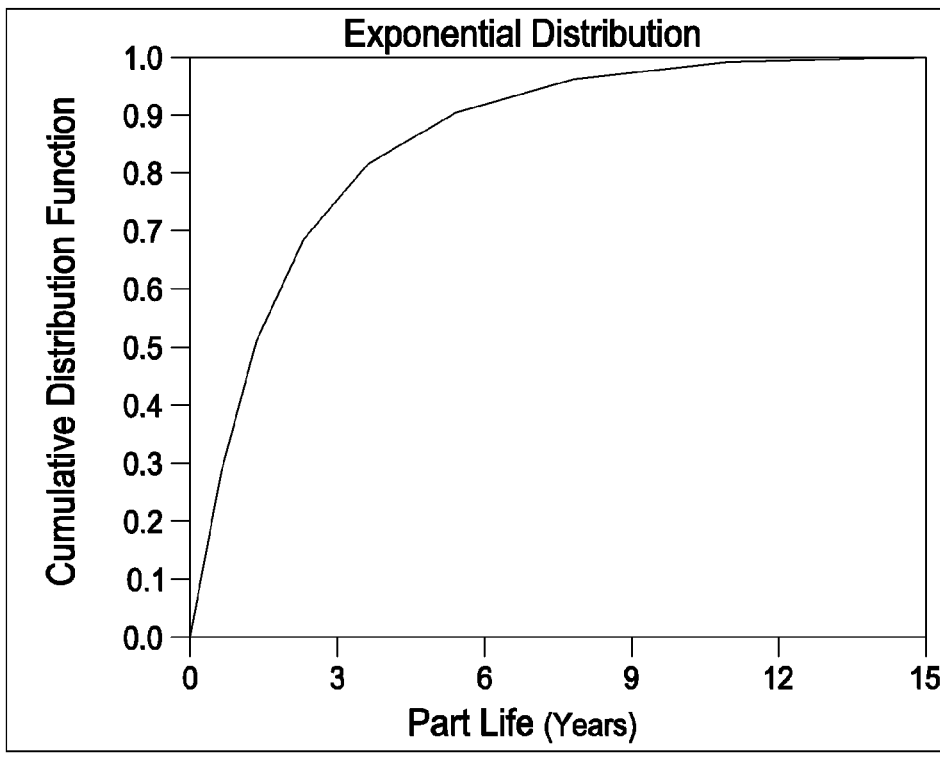
FIG. 9 is a cumulative distribution function utilized in the determination of the probability at a given point in time of part failure.
Figure 10:
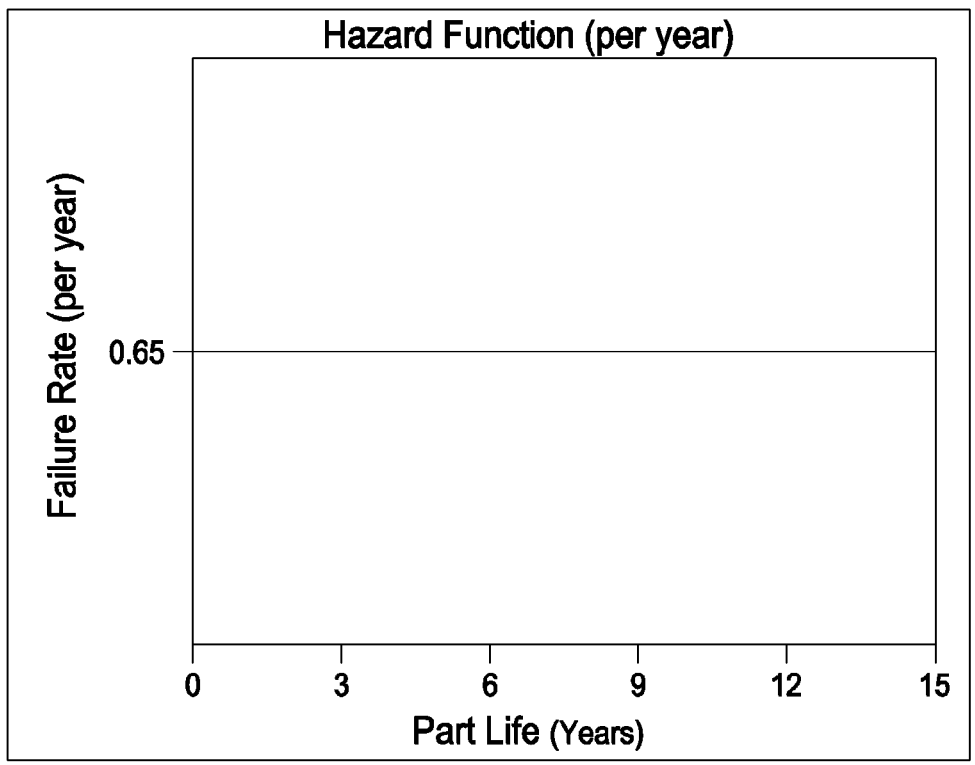
FIG. 10 is an illustration showing an incorporation of a cumulative distribution function and a hazard function.

The CDF 430 of FIG. 9 is helpful to determine the level of probability at a given point in time of part failure. In the illustration, the inverse correlation to the density distribution 420 is readily apparent. These mirror each other because with the dataset used, there is an increasing probability that the part will fail as the part life progresses. The CDF 430 is helpful to gauge the acceleration of probability to predict at what age the part is most likely to fail. With the incorporation of the CDF 430 into a hazard function 440 as shown in FIG. 10, it is possible to pick a specific point in time and predict the probability that a part will have failed. In addition, the hazard function 440 illustrates the probability rate that a part will fail at any given time. The illustration of the hazard function 440 further illustrates that there is a constant rate of part failure regardless of the actual part lifetime. For the dataset entered, the hazard function 440 is using a constant rate of 0.65 failure probability rate per year.

Figure 11:
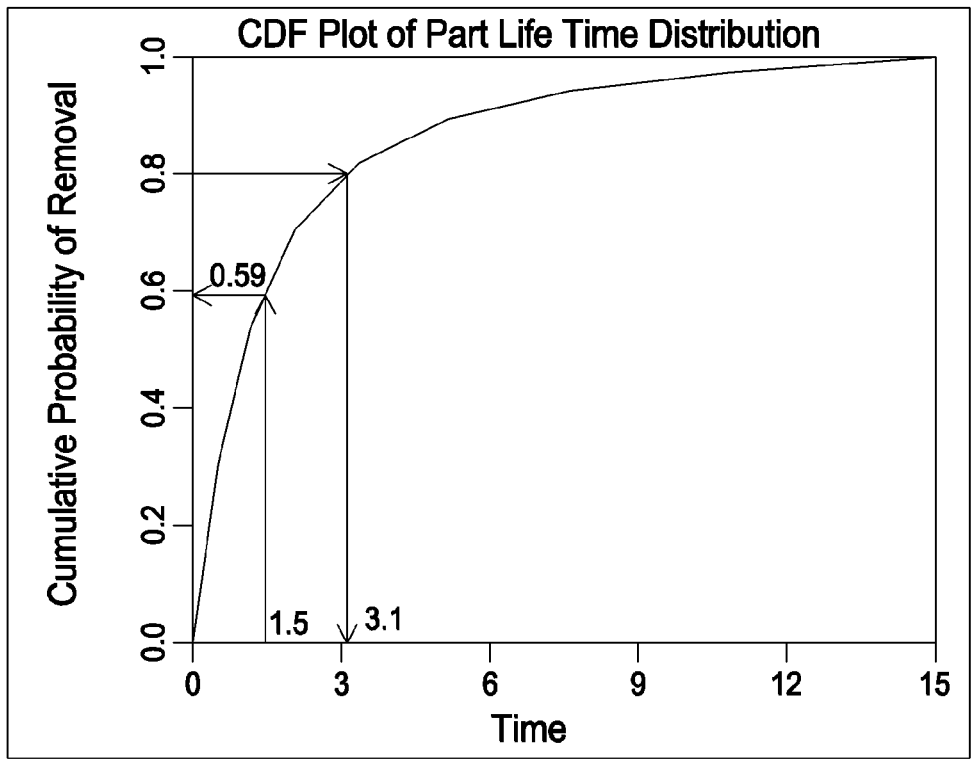
FIG. 11 is a graph that illustrates a fixed point in time that is provided by the next scheduled depot maintenance date and an associated probability of failure for a selected part.

The final step to fully integrating the lifetime distribution model failure rate with a depot maintenance schedule is the fixing of a point in time to determine an actual probability. In the embodiments described, the fixed point in time is simply provided by the next scheduled depot maintenance date as illustrated in FIG. 11. FIG. 11 is a distribution 450 that represents the probability as displayed on the 'y' axis at a fixed point in time as displayed by the 'x' axis. Using this logic, the program or scheduler inserts the amount of time since the part was put in service and plots out the amount of time until the scheduled depot visit. For this example, the lifetime failure data modeling shows that at 1.5 years since a part was put in production, there is a 0.59 probability of failure. Similarly, at a part age of 3.1 years, the model shows a 0.80 probability of failure. Each part is plotted according to its own particular model by entering the difference in the amount of time from the upcoming depot date to determine the failure propensity coefficient. By aggregating the upcoming visits for an extended amount of time with the individual probability of failure rates, additional integrity is achieved in the model.

Aggregating several part lifetime demands allows for flexibility if there is an error in one of the failure values. If the model has been validated for an even distribution of error residuals, the likelihood that the part is needed for another aircraft would be high, decreasing the risk of acquiring parts that would not be used.

The above described embodiments provide capabilities such as an ability to automatically perform data collection and integration into a predefined format for analysis, and an ability to interpret the data and align the previous lifetime information to a specific lifetime distribution. In addition, an ability to validate that the lifetime selection adequately represented the dataset, an ability to validate that an error residual was evenly distributed across each quartile of the entire distribution, and an ability to provide feedback to the scheduler if a part was going to fail at an upcoming depot visit are all provided by the systems and methods described herein.

One benefit to the systems and methods described above is that they can be easily be integrated into any lifetime modeling system that is trying to support a spares program for an aging platform. Such systems and methods therefore provide a business value over existing solutions as adequate fulfillment of performance based logistics (PBL) stipulations, in addition to an improved performance, for example, measured in days of non-mission ready status, are provided and/or improved and can be applied to both aerospace and non-aerospace platforms.

The systems and methods improve a competitive position, allowing a user to capture PBL business based on improved capability to forecast demand on low mortality parts. Sustainment improvement enabled by the embodiments improve an ability to realize any PBL incentives and avoid availability penalties. Customers also benefit due to mission-ready status improvements, and time reductions in depot level maintenance.

While the invention has been described in terms of various specific embodiments, those skilled in the art will recognize that the invention can be practiced with modification within the spirit and scope of the claims.

What is claimed is:

1. A computer-based method for predicting a probability of failure for a component of a platform at a specified time, said method comprising:
    collecting, within a computer memory, historical maintenance data relating to the component;
    selecting, utilizing the collected historical maintenance data, a lifetime distribution model that best fits the historical maintenance data;
    estimating, with a computer, upcoming component failures using the selected lifetime distribution model; and
    applying maintenance schedule dates for the platform to the upcoming component failures, with the computer, to determine a likelihood of failure of the component on one of the scheduled maintenance dates; wherein selecting a lifetime distribution model that best fits the historical maintenance data comprises using at least one of a predetermined goodness of fit factor and a lack of fit test, to determine a fit of the collected historical maintenance data to each of the available lifetime distribution models; and wherein using the at least one of the predetermined goodness of fit factor and the lack of fit test comprises evaluating a fit of the historical maintenance data with a lifetime distribution model using a test statistic that describes how closely resulting data emulates each available lifetime distribution model.

2. A computer-based method according to claim 1 wherein selecting a lifetime distribution model comprises selecting one of a normal distribution model, an exponential distribution model, a Weibull distribution model, a lognormal distribution model, and a gamma distribution model.

3. A computer-based method according to claim 1 wherein selecting a lifetime distribution model comprises contrasting actual failure and lifetime data for the component to several lifetime distribution models.

4. A computer-based method for predicting a probability of failure for a component of a platform at a specified time, said method comprising:
    collecting, within a computer memory, historical maintenance data relating to the component;
    selecting, utilizing the collected historical maintenance data, a lifetime distribution model that best fits the historical maintenance data;
    estimating, with a computer, upcoming component failures using the selected lifetime distribution model;
    applying maintenance schedule dates for the platform to the upcoming component failures, with the computer, to determine a likelihood of failure of the component on one of the scheduled maintenance dates;
    comparing a distribution of residuals with a distribution of errors in the selected lifetime distribution model using a quartile plot; and
    interpreting abnormal deviations from the error distribution as a potential deficiency in the selection of a particular lifetime distribution model.

5. A computer-based method for predicting a probability of failure for a component of a platform at a specified time, said method comprising:
    collecting, within a computer memory, historical maintenance data relating to the component;
    selecting, utilizing the collected historical maintenance data, a lifetime distribution model that best fits the historical maintenance data;
    estimating, with a computer, upcoming component failures using the selected lifetime distribution model;
    applying maintenance schedule dates for the platform to the upcoming component failures, with the computer, to determine a likelihood of failure of the component on one of the scheduled maintenance dates;
    creating a cumulative distribution function for the selected lifetime distribution model for the component to establish a compounding aggregation of failure throughout its lifetime:
    generating a hazard rate distribution, illustrating a rate at which the component fails, for the elected lifetime distribution model;
    wherein applying maintenance schedule dates for the platform to the upcoming component failures comprises:
    applying the scheduled maintenance dates to the lifetime distribution model by extracting and utilizing the cumulative distribution function and hazard rate distribution to evaluate the likelihood of component failure on the actual scheduled maintenance date;
    representing the likelihood of component failure as a failure propensity coefficient; and
    presenting the failure propensity coefficient to a maintenance scheduler.

6. A system for predicting a probability of failure for a component of a platform at a specified time, said system including at least one computer programmed to cause a computer processor to:
    receive and store historical maintenance data relating to the component;
    select a lifetime distribution model that best fits the stored historical maintenance data;
    estimate an upcoming component failure using the selected lifetime distribution model; and
    apply maintenance schedule dates for the platform to the upcoming component failure estimate to determine a likelihood of failure of the component on one of the scheduled maintenance dates; wherein to select a lifetime distribution model that best fits the stored historical maintenance data, said computer is programmed to use a predetermined goodness of fit factor to determine a fit of the stored historical maintenance data to each of the available lifetime distribution models; and wherein said computer is programmed to evaluate a fit of the stored historical maintenance data with the lifetime distribution model using a test statistic that describes how closely resulting data emulates each available lifetime distribution model.

7. A system according to claim 6 wherein said computer is programmed with at least one of a normal distribution model, an exponential distribution model, a Weibull distribution model, a lognormal distribution model, and a gamma distribution model.

8. A system according to claim 6 wherein said computer is programmed to contrast actual failure and lifetime data for the component against a plurality of lifetime distribution models.

9. A system according to claim 6 wherein to estimate upcoming component failures, said computer is programmed to:
- create a cumulative distribution function for the selected lifetime distribution model for the component to establish a compounding aggregation of failure throughout its lifetime; and
- generate a hazard rate distribution that illustrates a rate at which the component fails, for the elected lifetime distribution model.

10. A system according to claim 9 wherein to apply maintenance schedule dates for the platform to the upcoming component failures, said computer is programmed to:
- apply the scheduled maintenance dates to the lifetime distribution model by extracting and utilizing the cumulative distribution function and hazard rate distribution to evaluate the likelihood of component failure on the actual scheduled maintenance date;
- represent the likelihood of component failure as a failure propensity coefficient; and
- present the failure propensity coefficient to a maintenance scheduler.

11. A system for predicting a probability of failure for a component of a platform at a specified time, said system including at least one computer programmed to cause a computer processor to:
- receive and store historical maintenance data relating to the component;
- select a lifetime distribution model that best fits the stored historical maintenance data;
- estimate an upcoming component failure using the selected lifetime distribution model; and
- apply maintenance schedule dates for the platform to the upcoming component failure estimate to determine a likelihood of failure of the component on one of the scheduled maintenance dates; wherein said computer is programmed to:
- compare a distribution of residuals with a distribution of errors in the selected lifetime distribution model using a quartile plot; and
- interpret abnormal deviations from the error distribution as a potential deficiency in the selection of a particular lifetime distribution model.

12. A computer-based maintenance and repair method associated with low volume and long lead time parts for a platform, said method comprising:
- utilizing a depot maintenance schedule within a computer memory to identify scheduled visits of a platform to a depot level maintenance area;
- retrieving, at a computer associated with the computer memory, maintenance data relating to low volume and long lead time parts associated with the platform;
- mining the retrieved maintenance data, with the computer, to determine a lifetime distribution model that best fits historical part failures;
- applying, using the computer, a dynamic model to each part lifetime to produce a failure propensity coefficient for each part with respect to each scheduled depot level maintenance area visit; and
- building an estimated demand plan for upcoming part failures, based on the failure propensity coefficients and the scheduled depot level maintenance area visits.

13. A maintenance and repair method according to claim 12 further comprising commencing procurement of at least one low volume and long lead time replacement part if the failure propensity coefficient indicates a confidence level that the part will fail at a scheduled depot level maintenance area visit.

14. A maintenance and repair method according to claim 13 further comprising:
- verifying an operational status of at least one low volume and long lead time replacement part during a depot level maintenance area visit for the platform on which the part is deployed; and
- upon determining the part has not failed, and does not need to be replaced, updating the lifetime distribution model for the part; and
- re-verifying the selected lifetime distribution model provides the best fit for part failures.

15. A maintenance and repair method according to claim 13 further comprising:
- verifying an operational status of at least one low volume and long lead time replacement part during a depot level maintenance area visit for the platform on which the part is deployed; and
- upon determining the part has not failed, and does not need to be replaced, re-evaluating other upcoming depot level maintenance area visit determine the next best utilization for the unused, but now procured low volume and long lead time replacement part.

* * * * *